United States Patent [19]

Fontenot

[11] Patent Number: 5,116,490
[45] Date of Patent: May 26, 1992

[54] ROTARY SCREEN APPARATUS FOR USE WITH COOLING TOWERS

[76] Inventor: Herman Fontenot, Rte. 8, Box 491A, Opelousas, La. 70570

[21] Appl. No.: 496,861

[22] Filed: Mar. 21, 1990

[51] Int. Cl.[5] .................... B01D 33/15; B01D 33/50
[52] U.S. Cl. .................... 210/158; 209/271; 209/411; 210/161; 210/232; 210/391; 210/486
[58] Field of Search ............... 210/154–158, 210/161, 162, 331, 346, 232, 359, 391, 393, 411, 486; 261/DIG. 11, 2–6; 165/119, 900; 52/245; 209/250, 271, 361, 408, 411

[56] References Cited

U.S. PATENT DOCUMENTS

| 1,726,608 | 9/1929 | Brackett | 210/161 |
| 2,696,916 | 12/1954 | Peterson et al. | 210/331 |
| 2,901,113 | 8/1959 | Newell | 210/158 |
| 3,242,872 | 3/1966 | Thompson | 210/158 |
| 3,948,779 | 4/1976 | Jackson | 210/331 |
| 4,343,698 | 8/1982 | Jackson | 210/161 |
| 4,360,426 | 11/1982 | Wetzel | 210/158 |
| 4,427,553 | 1/1984 | Fore | 261/DIG. 11 |
| 4,676,893 | 6/1987 | Travade et al. | 210/161 |
| 4,814,076 | 3/1989 | Jackson | 210/158 |

FOREIGN PATENT DOCUMENTS

| 602884 | 4/1926 | France | 210/158 |
| 618316 | 2/1949 | United Kingdom | 210/158 |
| 708532 | 5/1954 | United Kingdom | 210/155 |

Primary Examiner—Robert A. Dawson
Assistant Examiner—Joseph Drodge
Attorney, Agent, or Firm—Pravel, Gambrell, Hewitt, Kimball & Krieger

[57] ABSTRACT

An improved rotary screen for high volume water screening includes a rectangular truss having a forward bearing surface supporting a rotary screen element supported by a central rotating hub and a plurality of radial beams connecting to a peripheral beam. A curved support on the truss forward surface transfers screen load during use between the peripheral beam to the truss.

7 Claims, 3 Drawing Sheets

ROTARY SCREEN APPARATUS FOR USE WITH COOLING TOWERS

BACKGROUND OF THE INVENTION

1. Field of the Invention

The present invention relates to the screening of high volumes of water such as are generated in cooling towers in industrial and chemical plants. Even more particularly, the present invention relates to an improved rotary screen apparatus wherein a structural deep frame carries a rotary screen element on its forward surface and wherein load is transferred from the screen to the frame via a central hub of the screen and a peripheral beam support on the frame, and wherein radial struts of the screen extending between the hub and its periphery support the frame against the load transfer thereto by high flow of water across the screen.

2. General Background

In petrochemical plants and other such refineries, and in some industrial applications, large cooling towers are used to provide heat transfer for various processes. Typically, in the petrochemical industry very large cooling towers can generate an enormous volume of water which must be continuously recirculated, screened, and treated. Most bar screens are highly complicated devices using travelling belts that must be supported at the ends of the belt by tensioning mechanisms that are complicated, expensive, and often require extensive maintenance. Several devices have been patented which relate to screened devices which move or rotate in order to continuously remove filtered material from the flow stream. The following table lists various patents that include water intake screens and screening devices for use in treating water and waste streams.

| Patent No. | Title | Issue Date |
|---|---|---|
| 4,582,601 | Polymeric Basket Frame For A Traveling Water Screen | 04/15/86 |
| 4,541,930 | Interchangeable Screen Panels For A Traveling Water Screen | 09/17/85 |
| 4,343,698 | Water Intake | 08/10/82 |
| 4,198,299 | Microscreen Method And Apparatus | 04/15/80 |
| 4,192,749 | Screens For Water Intakes | 03/11/80 |
| 3,893,923 | Screening And Comminuting Device | 07/08/75 |
| 3,351,204 | Filtering Device | 11/07/67 |
| 2,022,336 | Self Cleaning Screen | 11/26/35 |
| 2,013,971 | Automatic Screening And Filtering Apparatus | 09/10/35 |
| 1,740,578 | Screen | 12/24/29 |
| 1,516,693 | Rotary Strainer | 11/25/24 |

SUMMARY OF THE INVENTION

The present invention provides an improved rotary screen filter apparatus for use in high quantity filtration of cooling tower water. The apparatus includes a structural truss frame having first and second spaced-apart, generally rectangular frame members defining front and rear surfaces and a plurality of fore/aft extending beam struts joining the front and rear frame members, forming a truss therewith. A rotary shaft is mounted to the truss and extends fore/aft in the central portion of the truss generally between the front and rear surfaces thereof.

A rotary screen is mounted on the shaft for rotation with respect to the truss, the screen comprising a central hub, a plurality of radially extending, circumferentially spaced beams extending from the hub and mounted rigidly thereto, and a peripheral circular beam defining the periphery of the screen at the end of each radial beam, the radial beam being rigidly attached to the peripheral beam, and a layer of screen attached to and supported by the combination of the hub, radial beams and peripheral beams.

A peripheral curved track mounted on the upstream surface of the truss is shaped to track of the periphery of the screen through at least an obtuse angel of about 180°, the track including a backing member that supports the periphery of the screen at the peripheral beam on the downstream side of the screen.

The present invention relates to an improved rotary screen filter useful in the safe and efficient operation of industrial cooling water system equipment. The present invention provides a method of prevention of damage and subsequent unanticipated shutdown of cooling water system pumps as incurred by floating debris from the attached and adjacent cooling tower water basin. Uninterrupted free flow of pumped cooling water designed to service industrial equipment operations where petrochemical distillation, electrical generation, and refrigeration is the ultimate goal, and is of utmost importance for maintaining safe operating parameters necessary to control equipment performance. Uncontrolled operating parameters such as that caused by the loss of cooling water can and do affect hydrocarbon and other hazardous materials within the pressure containing vessels to the point of danger and catastrophe. Hence, proper operation of primary and secondary cooling water pumps cannot be ignored, due to the hazards which can subsequently be presented to plant and public persons and property in the vicinity of aforementioned primary operating equipment.

The present invention is superior to prior art designs installed for the purpose of screening and preventing debris which may cause intermittent shutdown of cooling water pumps.

The key design factor in successful long term operation of this apparatus and related hazardous industrial equipment is the convenience of cleaning and removing debris without safety hazards, expense, and hardships imposed by currently used designs. The circular rotating screen section of this proposed apparatus is designed of a size that is several times greater than the diameter of the adjacent cooling water pump suction inlet pipe or casing. The apparatus can be mounted to the cooling water basin walls prior to cooling water pumps in such a manner that all water introduced to the pumps'suction must pass through the center rotating screen and its radial bracing sections where screen material of ¼" to 1" or larger pore size and 10 gauge or larger thickness, for example, provides a stop to larger more harmful free floating debris.

The device consists includes a stationary supporting framework, a stationary debris stop screen, a rotating screen framework, a rotating debris stop screen, a rotating hub and shaft, and rotating debris stop shaft bearings.

The stationary framework can be rectangular in shape and sized to fit an individual pump sump entrance flue configuration. The support framework is constructed of beams of galvanized carbon steel or stainless steel material to meet customer requirements for corrosion protection. The front surface of the frame has a half circular shape which locks in with the rotating debris stop screen for preventing passage of free floating materials to the pump suction.

The stationary debris stop screen material is made of carbon steel galvanized or stainless steel 10-gauge or better screen or expanded metal. The screen material is attached to the stationary debris stop framework by welding with compatible metal filler materials or attached by bolts/nuts/clamp devices of same construction metals.

The rotating debris stop screen framework is made of carbon steel, galvanized, or stainless steel ¼" angle-iron rolled to a circle and welded in one place with compatible materials to make a complete circular frame. Radial braces are attached to the interior of the circular frame at a hub and then attach to the metal donut piece to which the shaft is attached. Size of this component depends upon that required to adequately give coverage to the opening of the sump inlet to the pump suction.

The rotating debris stop screen can be constructed, for example, of carbon steel galvanized or stainless steel 10-gauge or better screen material or expanded metal. The screen material is attached to the rotating circular debris stop framework and radial bracing pieces by welding with compatible metal filler materials or attached by bolts/nuts/clamp devices of same construction materials as the framework to prevent galvanic corrosion. Size of the rotating debris stop screen is the same as that of the rotating debris stop frame which is dependent upon the opening of the sump inlet to the pump suction.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
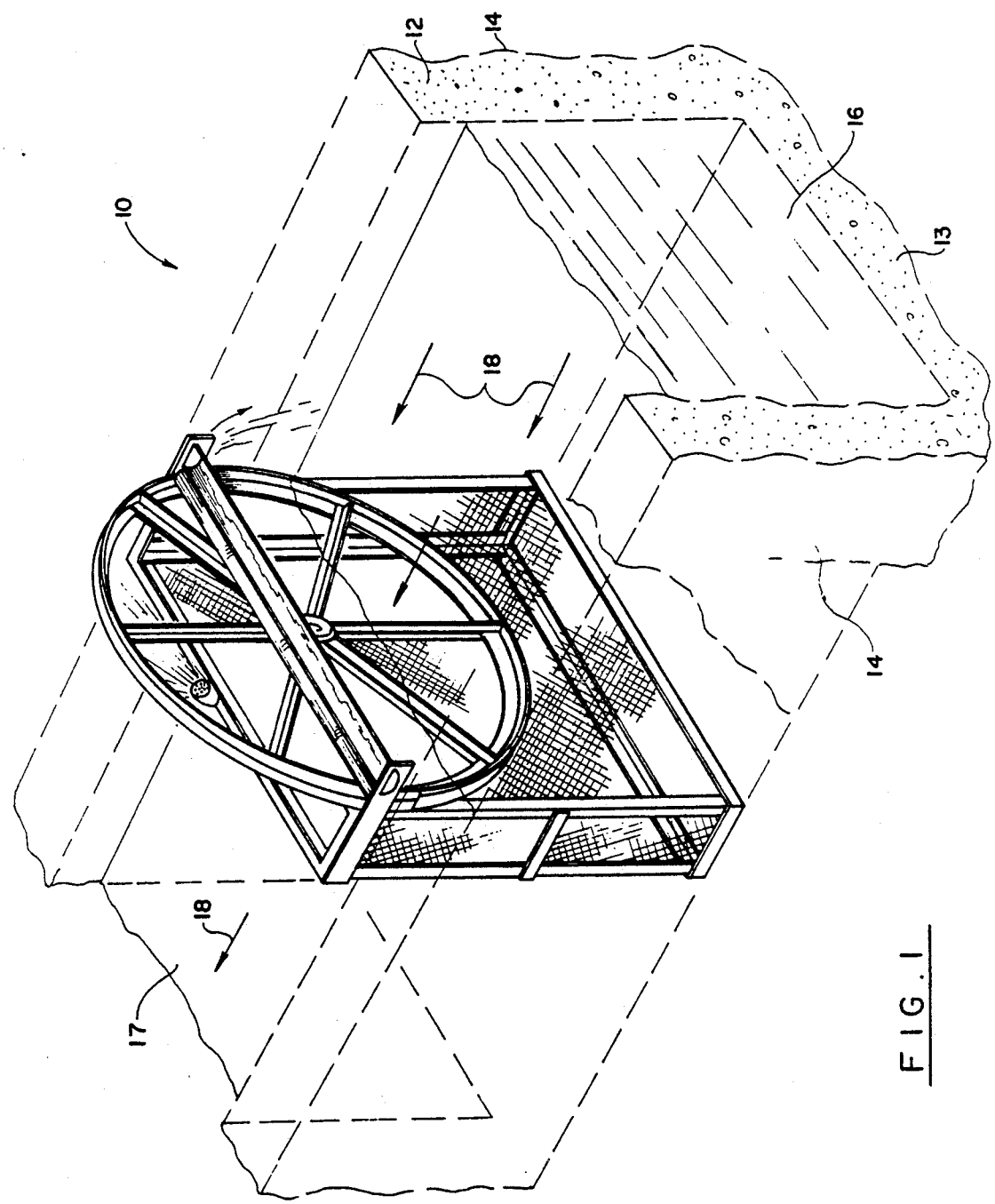
FIG. 1 is a perspective view of the preferred embodiment of the apparatus of the present invention.
Figure 2:
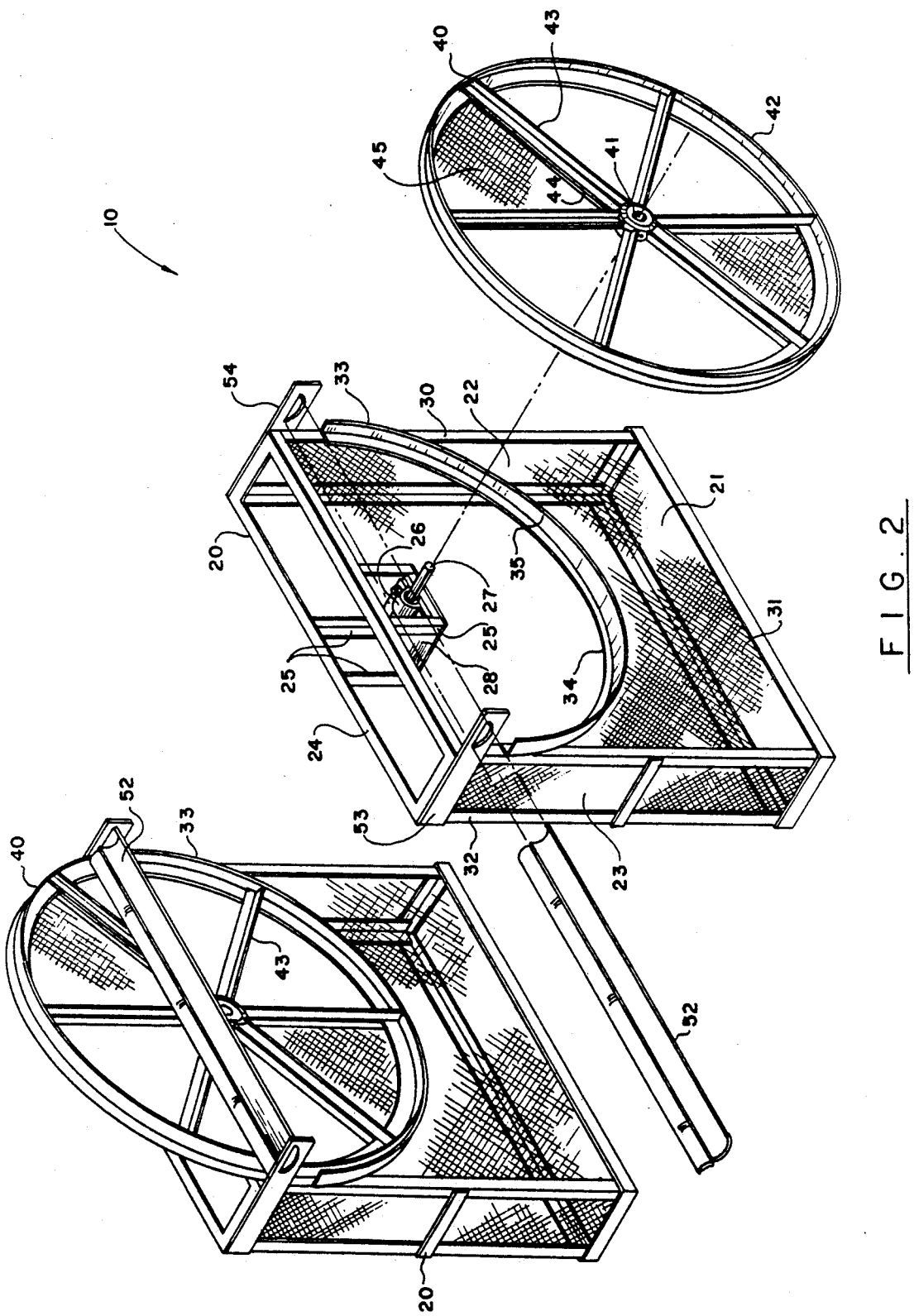
FIG. 2 is an exploded view of the preferred embodiment of the apparatus of the present invention.

FIGS. 1 and 2 illustrate the preferred embodiment of the apparatus of the present invention designated generally by the numeral 10. Rotary screen apparatus 10 has particular utility in the screening of very high volumes of water, such as is typically incurred in the operation of petrochemical and refinery cooling towers. These cooling towers can be, for example, several stories high and generate enormous volumes of water on a continuously circulating basis. In FIG. 1, an exit flume 12 is shown which carries effluent water from a cooling tower in a channel fashion to a pump. Flume 12 is defined by a bottom wall 13 which is substantially flat, and a pair of generally vertical sidewalls 14 producing a generally square or rectangular cross-sectional flow zone. Flume 12 can be constructed of reinforced concrete, for example. The flume includes an influent end portion 16 that communicates directly with the cooling tower (not shown), and an exit flume 17 that carries effluent away from the screen 10 apparatus to a pump for recirculation or discharge. Arrows 18 in FIG. 1 indicate the direction of flow of fluid between influent 16 and effluent 17 end portions of flume 12.

Figure 3:
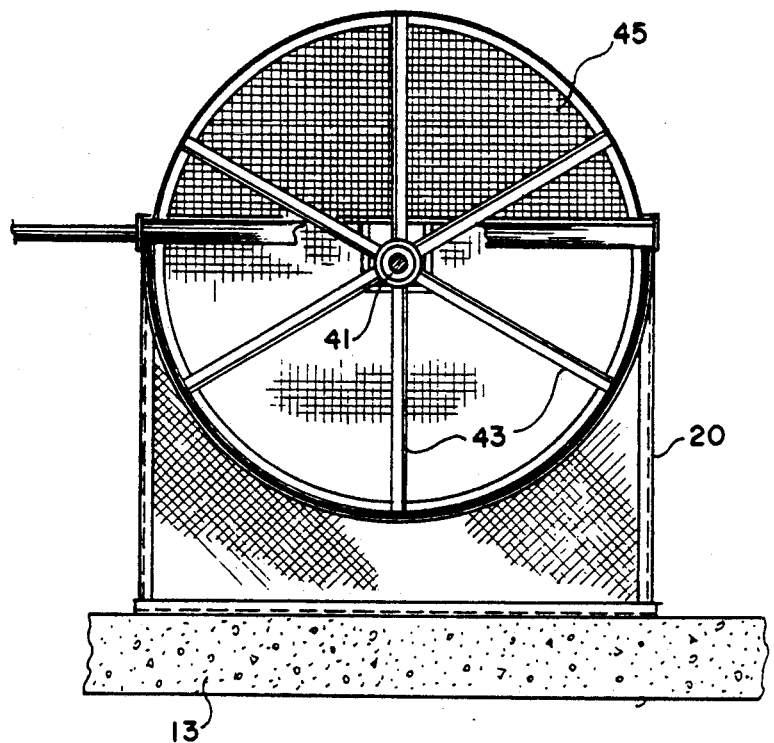
FIG. 3 is a front view of the preferred embodiment of the apparatus of the present invention.
Figure 4:
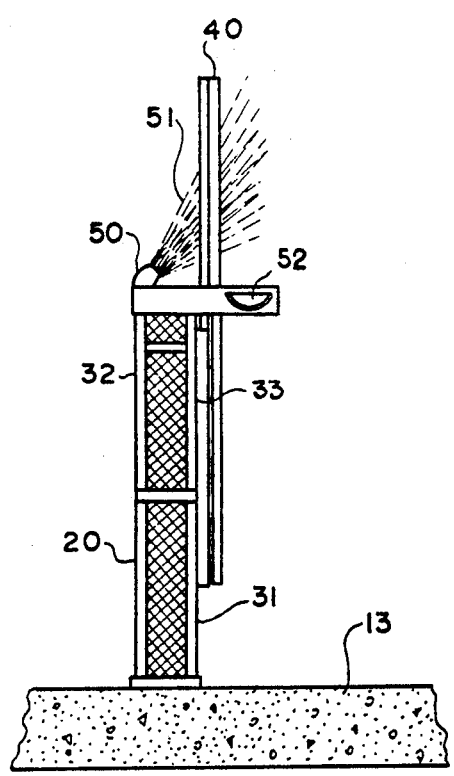
FIG. 4 is a side view of the preferred embodiment of the apparatus of the present invention.

In FIGS. 2-4, there can be seen more particularly the construction of screen apparatus 10. An enlarged generally rectangular frame 20 is provided which includes bottom wall 21 and a pair of generally vertically upstanding sidewalls 22, 23. Each of the walls 21, 23 is bordered by a plurality of structural peripheral beams so that each wall is rigid, preferably manufactured of welded steel flanged beam construction. Screen material can be used to cover each wall 21-23, such as, for example, expanded metal. A top wall 24 likewise is comprised of a plurality of structural steel flanged beams, such as angle shapes for example.

Top wall 24 carries a plurality of downwardly depending struts 25 that supports plate 28 and one or more bearings 26 for supporting rotary shaft 27. Shaft 27 forms a connection with hub 41 of rotary screen element 40. Frame 20 provides a forward surface 30 which is substantially flat covered with forward screen element 31 and a rear surface 32 which is substantially flat but which is not screened. The frame 30 extends vertically and laterally as well as longitudinally so that the frame has a thickness of approximately one foot (1') as compared to a rotary screen 40 diameter of approximately eight feet - ten feet (8'-10'). Thus, the frame 20 provides a rigid truss for carrying the load that is transferred from the travelling stream of fluid contained in flume 12 to the rotary screen element 40. The load from rotary screen element 40 is transferred to frame 20 at shaft 27, and at peripheral curved track 33 which acts as a beam support. Curved track 33 is of a generally U-shape configuration, extending approximately 180° about the rotary screen element 40, as shown in FIGS. 1 and 2. The peripheral beam 33 is L-shaped in cross section, including a backing flange member 34 and a peripheral flange member 35. The peripheral flange member 35 tracks the contour of the periphery 42 of screen element 40 which is circular in configuration.

Figure 5:
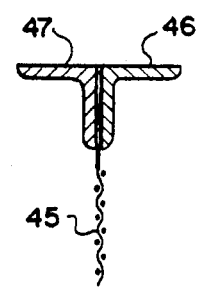
FIG. 5 is a fragmentary view of the preferred embodiment of the apparatus of the present invention illustrating the rotating screen and peripheral strut support portions thereof.
Figure 6:
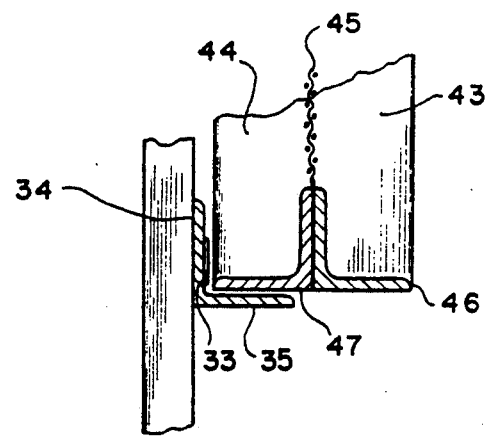
FIG. 6 is a fragmentary sectional view of the preferred embodiment of the apparatus of the present invention illustrating the curved beam support portion of the frame.

A plurality of paired beams extend radially from hub 41 to the periphery 42 of screen element 40. Each pair of beams includes a beam 43 on the upstream surface of screen element 45 and a downstream beam 44 on the downstream side of screen element 44. Thus, the screen 45 is sandwiched between forward, upstream radial beams 43 and correspondingly positioned downstream beam elements 44. Additionally, the periphery 42 of element 40 includes upstream 46 and downstream 47 beams placed on opposites sides of screen element 45, as shown in FIGS. 5 and 6. Thus, substantially all of the load generated by the flowing stream of fluid in flume 12 is carried by flanged beams including the plurality of upstream and downstream radial beams 43, 44 which span between hub 41 and periphery 42 which includes peripheral beams 46 and 47. Load is transferred from the hub to shaft 27 and then to struts 25 and to support plate 28. At the periphery, the plurality of beams 43, 44 form a structural connection with the peripheral, generally circular beams 46, 47, and transfer load from those beams to the generally U-shaped beam 33. The flange 35 insures proper alignment of screen 40 while the beam element 34 and the element 35 carry any load which tends to deflect the screen 40 rearwardly. Since frame 20 is of a truss-like configuration which includes not only forward 30 and rear 32 surfaces which are spaced apart but also sidewalls 21-23 for added support. This frame 20 carries a full load which is transmitted thereto via the shaft 2 and the peripheral beam 33.

Sprayers 50 can be positioned on the top of frame 20 for backflushing screen 45, as shown in FIG. 4, the spray of water being indicated by the numeral 51.

Trough 52 extends transversely across the forward face of screen 40 for catching debris that drops off the forward face of screen element 45 during backwashing with sprayers 50. A pair of forwardly extending supports 53, 54 support trough 52 in position.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A rotary screen filter apparatus for high quantity filtration of cooling tower water traveling along a generally linear flow path in a flow channel comprising:
   (a) a structural truss having a central portion, an upstream surface, and a downstream surface and having front and rear spaced apart, generally rectangular frame members defining upstream and downstream surfaces and a plurality of struts joining the upstream and downstream frame members, forming a truss therewith;
   (b) a rotary shaft mounted on the central portion of the truss and aligned with the linear flow path;
   (c) a rotary screen having a periphery and mounted on the rotary shaft for rotation with respect to the truss, the rotary screen comprising a central hub, a plurality of radially extending, circumferentially spaced beams, each radially extending beam having an inner end and an outer end and extending from the hub and mounted rigidly thereto, and a peripheral circular beam defining the periphery of the rotary screen and rigidly attached to the outer end of each radially extending beam, and a layer of screen material attached to and supported by the combination of said hub, radially extending beams, and peripheral beam;
   (d) a peripheral, curved track mounted on the upstream surface of the truss, and shaped to track the periphery of the rotary screen through at least an obtuse angle, the curved track including a backing member arranged to support the periphery of the rotary screen at the peripheral circular beam on the downstream side of the rotary screen, wherein the rotary shaft extends between and is joined to the upstream and downstream frame members.

2. The rotary screen filter apparatus of claim 1 wherein the curved track extends about 180° around the periphery of the rotary screen.

3. The rotary screen filter apparatus of claim 1 wherein the periphery of the rotary screen includes a lower half and the curved track supports the lower half of the periphery of the rotary screen during use.

4. The rotary screen filter apparatus of claim 1 wherein:
   the rotary screen includes an upstream and a downstream surface, and there are radially extending beams on both the upstream and downstream surfaces of the rotary screen.

5. The rotary screen filter apparatus of claim 4 wherein:
   some of the radially extending beams have forwardly extending portions that catch trash falling from the rotary screen during use or during backwashing.

6. The rotary screen filter apparatus of claim 5, further comprising a manifold that extends across the truss and multiple spray heads on the manifold, pontooned to spray backwash water on the downstream surface of the rotary screen.

7. The rotary screen filter apparatus of claim 5 wherein:
   adjacent each radially extending beam on the downstream surface of the rotary screen is a correspondingly placed radially extending beam on the upstream surface of the rotary screen.

* * * * *